3,009,920
EPICHLOROHYDRIN-CONTAINING
PHTHALOCYANINE DYESTUFFS
Peter Jaeger, Binningen, Wernhard Huber, Basel, and Heinrich Zollinger, Binningen, Switzerland, assignors to Ciba Limited, Basel, Switzerland
No Drawing. Filed Sept. 25, 1958, Ser. No. 763,178
Claims priority, application Switzerland Sept. 25, 1957
3 Claims. (Cl. 260—314.5)

This invention provides organic dyestuffs which contain at least three rings having 5 or 6 members, at most two of the said rings being 6-membered rings directly fused together, and which also contain at least one acid group imparting solubility in water and at least one epoxy or $\alpha:\beta$-halogenhydrin group.

As examples of such organic dyestuffs there may be mentioned: Triphenylmethane, xanthene, oxazine, nitro or perinone dyestuffs, and especially azo-dyestuffs and phthalocyanine dyestuffs. As acid groups imparting solubility in water there may be mentioned, for example, carboxylic acid groups and especially sulfonic acid groups. Of special interest are dyestuffs which contain the glycidyl group of the formula

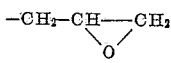

or the chlorhydrin group of the formula

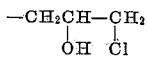

These groups are advantageously bound to the dyestuff molecule through a bridge, for example, an oxygen or sulfur atom or an imino, carboxylic acid amide or sulfonic acid amide group. Especially valuable are dyestuffs which correspond to the formula (1) 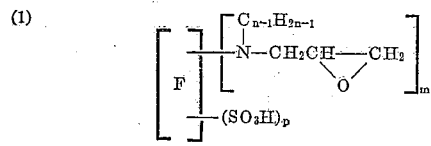

or (2) 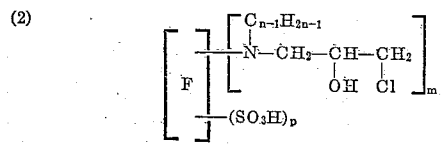

in which F represents the radical of a dyestuff molecule, m and p each represent a whole number of at least one, and n represents a whole number not greater than 4.

The new dyestuffs are made, in accordance with the invention, by reacting at any stage a dyestuff or dyestuff component, which contains at least one active hydrogen atom, with a compound capable of introducing an epoxy-group or halogenhydrin group, and so selecting the starting materials that the final dyestuff contains at least one acid group imparting solubility in water.

As starting materials there are advantageously used dyestuffs or dyestuff components which contain at least one acylatable amino group, which may be bound directly to the aromatic nucleus of the dyestuff or bound thereto through a bridge, for example, through an alkylene or arylene radical or a group of one of the formulae

—Z—A—
—SO$_2$NR—A—
—SO$_2$—A—
—CONR—A— in which R represents a hydrogen atom or an alkyl or phenyl group, A represents an alkylene or arylene group, especially a phenylene group, and Z represents an imino group or an oxygen or sulfur atom.

The epoxide group or chlorhydrin group may either be introduced into the parent dyestuff or into a dyestuff component from which the dyestuff is subsequently to be made. The latter procedure is especially advantageous in the case of azo-dyestuffs, an epoxy or chlorhydrin group being introduced, for example, into the diazo-component or the coupling component or into each of these components, and followed by diazotization and coupling. It will, of course, be understood that the diazotization and coupling must be carried out under conditions such that the epoxy or chlorhydrin groups are not attacked.

As examples of suitable coupling components containing at least one acylatable amino group, which can be reacted with compounds yielding epoxide or chlorohydrin radicals, more especially with epichlorohydrin or glycerol-$\alpha:\gamma$-dichlorohydrin, may be mentioned the following compounds: Aniline, N-methyl- or ethylaniline, 1-ethylamino-3-methylbenzene, 1-ethylamino-2-methoxy-3-methylbenzene, aminonaphthalenes and sulfonic acids thereof, such as 1- or 2-aminonaphthalene, 1-amino-naphthalene-2-, -4-, -5-, or -8-sulfonic acid, 2-aminonaphthalene-6:8-disulfonic acid, 1-aminonaphthalene-3:8-disulfonic acid, aminonaphtholsulfonic acids such as 2-amino-5-hydroxynaphthalene-7-sulfonic acid, 2-amino-8-hydroxynaphthalene-6-sulfonic acid, 1-amino-8-hydroxynaphthalene-3:6-disulfonic acid, pyrazolones such as 4′-aminophenyl-3-methyl-5-pyrazolone and the appropriate sulfonic acids or $\beta$-ketocarboxylic acid derivatives such as 1-acetoacetylamino-4-aminobenzene-3-sulfonic acid.

The resulting coupling components, which contain epoxide or chlorhydrin groups, are coupled with diazo compounds of amines. Suitable diazo components are, for example, aminobenzenes, such as aniline and sulfonic acids thereof, such as 1-amino-4-nitrobenzene-2-sulfonic acid, 1-amino-4-chlorobenzene-2-sulfonic acid, as well as aminonaphthalenes such as 1-aminonaphthalene-4- or -5-sulfonic acid. The coupling is advantageously performed in a neutral to weakly alkaline medium, and the components should be chosen so that the finished azo dyestuff contains at least three 5-membered or 6-membered aromatic or heterocyclic rings.

As examples of finished azo dyestuffs containing at least one mobile hydrogen atom may be mentioned trisazo or disazo dyestuffs and more especially monoazo dyestuffs which are obtained by coupling an amine with a coupling component.

As examples of suitable diazo components may be mentioned the following amines:

Aniline,
1-aminobenzene-2-, -3- or -4-sulfonic acid,
2-amino-1-methoxybenzene-4-sulfonic acid,
4-methoxy-1-aminobenzene-2-sulfonic acid,
3-amino-2-hydroxybenzoic acid-5-sulfonic acid,
3-amino-6-hydroxybenzoic acid-5-sulfonic acid,
2-aminophenol-4-sulfonic acid,
5-acetylamino-2-aminobenzene-1-sulfonic acid,
4-acetylamino-2-aminobenzene-1-sulfonic acid,
5-acetylamino- or 5-benzoylamino-2-aminobenzene-1-carboxylic acid,
2-aminobenzoic acid-4- or -5-sulfonic acid,
1-aminonaphthalene-4-, -5-, -6- or -7-sulfonic acid,
2-aminonaphthalene-4-, -6-, -7- or -8-sulfonic acid,
1-aminonaphthalene-3:6-disulfonic acid,
1-aminobenzene-2:5-disulfonic acid,
2-aminonaphthalene-4:8-, -5:7- or -6:8-disulfonic acid,
1-(3′- or 4′-aminobenzoyl)-aminobenzene-3-sulfonic acid,
3-aminopyrene-8- or -10-monosulfonic acid,
3-aminopyrene-5:8- or 5:10-disulfonic acid,
4-nitro-4′-aminostilbene-2:2′-disulfonic acid, furthermore O-acyl derivatives of aminonaphtholsulfonic acids, for example the O-acyl derivatives of 1-amino-8-hydroxynaphthalene-3:6- or -4:6-disulfonic acid,
Dehydrothiotoluidine-mono- or -disulfonic acid and the like.

Likewise suitable as diazo components are aminomonoazo dyestuffs containing sulfonic acid groups which can be made, for example, by coupling a diazotized monoacyl derivative of an aromatic diamine with a coupling component containing an aromatic hydroxyl group or a ketomethylene group and subsequent hydrolysis of the resulting acylaminomonoazo dyestuff. Relevant examples are aminomonoazo dyestuffs obtainable, for instance, by hydrolysis from phenols, naphthols, 5-pyrazolones, barbituric acids, hydroxyquinolines, β-ketocarboxylic acid derivatives and diazotized monoacyldiaminobenzenes, monoacyl-diaminostilbenedisulfonic acids and the like. Suitable diazotizable aminoazo dyestuffs are also coupling products of coupling components containing one of the specified amino groups with the diazo compounds of the likewise specified aminosulfonic acids.

The starting materials must be matched so as to yield aminoazo dyestuffs containing at least three 5-membered or 6-membered rings and preferably at least two groups imparting solubility in water. As examples of suitable coupling components may be mentioned those of the benzene series such as aniline, ω-methanesulfonic acid derivatives of aniline, of ortho-methoxyaniline and of ortho-aminobenzenecarboxylic acids (the ω-methanesulfonic acid being hydrolytically split after formation of the dyestuff in order to liberate the amino group); furthermore meta-toluidine, 3-acylamino-1-aminobenzenes, for example 3-acetylamino-1-aminobenzene, 1-amino-5-methyl-2-methoxybenzene, 1-amino-2:5-dimethoxy- or -diethoxybenzene, 1-amino-3-methoxybenzene, 1-amino-2-methoxy-5-isopropylbenzene, or coupling components which are derived from β-ketocarboxylic acid esters or amides and are capable of coupling in α-position, for example acetoacetic acid arylides, pyrazolones more especially 5-pyrazolones capable of coupling in 4-position such as 3-methyl-5-pyrazolone, 1-phenyl-3-methyl-5-pyrazolone, 1-phenyl-3-methyl-5-pyrazolone-2'-, -3'- or -4'-sulfonic acid, 1-phenyl-5-pyrazolone-3-carboxylic acid, 5-pyrazolone-3-carbonamides, barbituric acids, hydroxyquinolines such as 8-hydroxyquinoline, 2:4-dihydroxyquinoline and phenols such as para-cresol, 4-acetylamino-1-hydroxybenzene, 4-methyl-2-acetylamino-1-hydroxybenzene, 2-carboxy-1-hydroxybenzene, naphthols such as α- or β-naphthol, α- or β-naphthylamine, 2-hydroxynaphthalene sulfonamides, and above all amino- and/or hydroxynaphthalenesulfonic acids or the N-alkyl or N-aryl derivatives thereof, such as 1-hydroxynaphthalene-3-, -4-, -5- or -8-sulfonic acid, 2-hydroxynaphthalene-4-, -5-, -6-, -7- or -8-sulfonic acid, 1:8-dihydroxynaphthalene-3:6-disulfonic acid, 2-hydroxynaphthalene-3:6- or -6:8-disulfonic acid, 1-hydroxynaphthalene-3:6- or 3:8-disulfonic acid, 1-aminonaphthalene-6-sulfonic acid, 1-amino-8-hydroxynaphthalene-2:4-, -3:6- or -4:6-disulfonic acid and the N-acyl derivatives of amino- or alkylamino-naphtholsulfonic acids whose acyl radical is for example, an acetyl, propionyl, butyryl, chloracetyl, benzoyl, ortho-, meta- or para-chlorobenzoyl, nitrobenzoyl, tertiary butyl benzoyl, 3'- or 4'-aminobenzoyl, methanesulfonyl, ethanesulfonyl, para-toluenesulfonyl or chlorobenzene-sulfonyl, carbomethoxy or carbethoxy group.

There are suitable both metal-free azo dyestuffs and metal complexes of azo dyestuffs, for example those which contain copper, nickel, chromium or cobalt bound in complex union.

From among the phthalocyanine dyestuffs containing at least one active hydrogen atom there are suitable as starting materials in the present process, for example, those which contain at least one hydroxymethyl group, and more especially those which contain at least one acylatable amino group which is preferably present in an external nucleus, that is to say in a nucleus bound to the phthalocyanine nucleus through a bridge member, for example through a —CO— or —SO₂— group, or through a carbonamide group, a sulfonamide or a sulfonic acid aryl ester group. Instead of being present in an external nucleus, the acylatable group may be bound to an alkylene chain which is bound to the phthalocyanine molecule, for example, through an —SO₂NH or —SO₂— group. Both metal-free and metalliferous phthalocyanine dyestuffs of this description are suitable. It is of advantage to use a complex heavy-metal compound of the phthalocyanines containing sulfonic acid groups, for example an iron compound thereof, and more especially to use a phthalocyanine containing sulfonic acid groups and cobalt, nickel, copper or zinc—that is to say a heavy metal of ordinal numbers 27 to 30—bound in complex union. Relevant dyestuffs that yield particularly good results are the sulfonated copper phthalocyanines or copper phthalocyanines containing sulfonic acid groups. Depending on the adopted manner of manufacture, the sulfonic acid groups occupy the 4- or 3-position of the phthalocyanine molecule, according to whether they have been made from 4-sulfophthalic acid or whether they have been made by sulfonation or by direct sulfochlorination of phthalocyanine.

Such phthalocyanine dyestuffs, suitable as starting materials in the present process, can be prepared, for example, by reacting a phthalocyanine-sulfonic acid halide (such as can be obtained, for example, by treating a metal-free or metalliferous phthalocyanine with chlorosulfonic acid, or from a phthalocyanine-di-, -tri- or -tetrasulfonic acid by reaction with an acid-halogenating agent such as phosphorus halide, thionyl chloride or chlorosulfonic acid) with an organic compound containing an acylatable hydroxyl or amino group and in addition to this acylatable group another acylatable amino group or a substituent that can be converted into such a group after reaction with the phthalocyanine-sulfonic acid halide. As such organic compounds are suitable bifunctional organic compounds such as hydroxyamines, for example hydroxyethyleneamine, or diamines, for example cyclic, particularly aromatic diamines such as 4:4'-diaminodiphenyl, 4:4'-diamino-stilbene-2:2'-disulfonic acid, 1:4- or 1:3-diaminobenzene and above all 1:4-diaminobenzene-2-sulfonic acid and 1:3-diaminobenzene-4-sulfonic acid. There may also be used nitranilines or monoacyl derivatives of organic diamines, a new NH₂ group being liberated by reduction or hydrolysis after the reaction with the phthalocyanine-sulfochloride used. In selecting the starting material it must be ensured that the product formed contains in addition to at least one acylatable amino group preferably at least two sulfonic acid groups; the starting material to be used is, therefore, for instance a phthalocyanine dyestuff containing at least two sulfonic acid halide groups which is reacted with an hydroxyamine or diamine containing sulfonic acid groups; when an hydroxyamine or diamine is used that is free from sulfonic acid groups, it must be reacted with at most one sulfonic acid halide group of a phthalocyaninesulfonic acid halide that contains at least three such groups. Thus, for example, from 1 mol of a phthalocyanine-tetrasulfochloride and 1 to at most 2 mols of one of the aforementioned hydroxy-amines or diamines free from sulfonic acid groups, or of a monoacyl derivative thereof, there are obtained very valuable phthalocyanine dyestuffs suitable as starting material in the present process which, after hydrolysing the unreacted sulfonic acid chloride groups, contain at least two SO₃H groups and at least one acylatable amino group. When, on the other hand, use is made of an hydroxyamine containing sulfonic acid groups (such as 1-amino-3-hydroxybenzene-6-sulfonic acid) or of a diamine containing sulfonic acid groups (such as 1:3-diaminobenzene-4-sulfonic acid or 1:4-diaminobenzene-2-sulfonic acid), or of diaminomonoazo dyestuffs containing sulfonic acid groups or of a monoacyl derivative thereof, if desired more than two of the sulfonic acid chloride groups present in the parent phthalocyanine may participate in the reaction.

The specified dyestuffs or components, containing at least one active hydrogen atom, are reacted with compounds yielding epoxide groups or halogenohydrin groups.

As compounds capable of reacting with the dyestuffs or dyestuff components containing an active hydrogen atom with formation of a halogenohydrin group may be used:

(a) Compounds containing the radical of the formula $$-\underset{Hal}{CH}-\underset{OH}{CH}-$$

such as glycerol-α-monochlorohydrin, and more especially dihalogenohydrins such as glycerol-α:γ-dichlorohydrin, glycerol-α:β-dichlorohydrin; compounds of the formula $$\underset{Cl}{CH_2}-\underset{OH}{CH}-CH_2-O-CH_2-\underset{OH}{CH}-\underset{Cl}{CH_2}$$

or of the formula $$\underset{Cl}{CH_2}-\underset{OH}{CH}-\langle\bigcirc\rangle-\underset{OH}{CH}-\underset{Cl}{CH_2} \quad \text{or} \quad \underset{OH}{CH_2}-\underset{Cl}{CH}-\underset{Cl}{CH}-\underset{OH}{CH_2}$$

(Br) (Br)

or preferably (b) Epihalogenohydrins, more especially epichlorohydrin $$(ClCH_2-\underset{\diagdown O \diagup}{CH-CH_2})$$

with formation of $$-CH_2-\underset{OH}{CH}-\underset{Cl}{CH_2}-\text{groups}$$

When a compound of type (a) is used—other than glycerol-α-monochlorohydrin—the dyestuffs or the dyestuff components are preferably reacted in an aqueous solution in the presence of substantially 1 mol of alkali per mol of halogenhydrin. The reaction with an epihalogenohydrin can likewise be performed in an aqueous solution, but advantageously in the absence of a substantial amount of alkali. In the case of the reaction of a dyestuff containing amino groups with an excess of epichlorohydrin the reaction generally occurs even at room temperature without addition of a catalyst. Alternatively, the treatment with epichlorohydrin may be performed in an organic solvent such as benzene or acetone.

As compounds capable of reacting with dyestuffs or dyestuff components containing at least one active hydrogen atom, with formation of an epoxide group, are suitable—apart from the afore-mentioned halogenohydrins and epihalogenohydrins—butadiene dioxide or diglycidol ethers. In the case of dyestuff components containing amino groups the reaction in the first stage probably takes the following course:

$$R-\underset{}{N}-H + CH_2-\underset{\diagdown O \diagup}{CH}-CH_2Cl \longrightarrow R-\underset{C_{n-1}H_{2n-1}}{N}-CH_2-\underset{OH}{CH}-\underset{Cl}{CH_2}$$

$$R-\underset{C_{n-1}H_{2n-1}}{N}-H + CH_2-\underset{Cl}{CH}-\underset{OH}{CH_2} \longrightarrow R-\underset{C_{n-1}H_{2n-1}}{N}-CH_2\underset{OH}{CH}-\underset{Cl}{CH_2}$$

whereas in the second stage the epoxide group is formed, accompanied by elimination of hydrogen halide. When a diepoxide compound is used, the conditions employed should be such that only one epoxide group enters the reaction.

The dyestuffs obtained by the present process are suitable for dyeing a wide variety of materials, such as animalic fibers (e.g. wool), synthetic fibers (e.g. nylon), polyvinyl alcohol, and more especially fibrous materials from native or regenerated cellulose such, for example, as cotton, rayon and paper.

The dyeing operation consists of two stages, viz. application of the dyestuff to the fiber, and fixation of the dyestuff on the fiber. It is of advantage to perform the two steps separately: The material to be dyed is advantageously impregnated at room temperature or a slightly higher temperature with an aqueous solution of the dyestuff and then subjected to a heat treatment, advantageously in a current of air heated above 100° C. The impregnation can be carried out by the direct-dyeing method, by printing or by the so-called pad-dyeing method.

As bases capable of bringing about fixation of the dyestuff on the fiber may be mentioned the hydroxides and carbonates of the alkali metals, more especially sodium carbonate as well as sodium acetate or trisodium phosphate or tertiary amines. As a rule it is immaterial whether the dyestuff is first applied by padding and then the alkali added, or whether the alkali is present in the dyebath from the start.

In the following examples, which illustrate the invention, parts and percentages are by weight unless otherwise indicated.

*Example 1*

A neutral or slightly acetic acid solution is prepared in 400 parts of water of 42.3 parts of the dyestuff obtained by coupling in an alkaline medium diazotized aniline-2-sulfonic acid with 2-amino-5-hydroxynaphthalene-7-sulfonic acid; 46.3 parts of epichlorohydrin are added, and the whole is stirred for 20 hours at 25° C. After this time the epichlorohydrin—which initially did not dissolve completely in the water and formed a second layer—has completely disappeared. The reaction is accompanied by a change in color from orange-red to red. The dyestuff is salted out with sodium chloride and dried at 45 to 50° C. The dyestuff thus obtained dyes native and regenerated cellulose brilliant orange-red tints by the method described in Example 13 or 14. The dyeing is extremely fast to boiling and washing. By the printing method according to Example 15 prints which are very fast to washing are obtained on cellulose fabrics.

*Example 2*

23.9 parts of 2-amino-5-hydroxynaphthalene-7-sulfonic acid are dissolved in a solution of 6 parts of sodium carbonate in 200 parts of water and at 45 to 50° C. 37 parts of epichlorohydrin are added in the course of 2 hours. The mixture is stirred on for 4 hours at the same temperature.

17.3 parts of aniline-2-sulfonic acid are diazotized in the conventional manner and then coupled in a medium rendered alkaline with sodium carbonate with the above reaction product from 2-amino-5-hydroxynaphthalene-7-sulfonic acid and epichlorohydrin. The dyestuff is salted out with sodium chloride, filtered off and dried in vacuo at 50° C. It produces the same dyeings as described in Example 1.

*Example 3*

A neutral solution is prepared in 300 parts of water of 42.3 parts of the dyestuff, obtained by alkaline coupling of diazotized aniline-2-sulfonic acid and 2-amino-5-naphthol-7-sulfonic acid, and this solution is added to 43 parts of butadiene dioxide in 200 parts of water. After 8 hours at 25° C. the solution is evaporated in vacuo.

4 parts of the resulting dyestuff are dissolved in a mixture of 25 parts of urea, 75 parts of water and 3 parts of sodium hydroxide, and this solution is used for padding a cotton fabric which is then squeezed, dried and exposed for 5 minutes to dry air heated at 140° C.; the fabric is then soaped, rinsed and dried. The resulting orange-red dyeing is fast to boiling and soap.

Instead of butadiene dioxide another diepoxide may be used, for example glycol diglycidol ether or diglycol diglycidol ether.

Example 4

A neutral solution is prepared in 200 parts of water of 32 parts of 8-amino-1-naphthol-3:6-disulfonic acid (in the form of the sodium salt) and 30 parts of epichlorohydrin are slowly added at 45° C. The mixture is stirred for a total period of 3 hours at 45° C., and 50 parts of ice and 18 parts of sodium carbonate are then added. A diazotized solution of 9.3 parts of aniline is then run in at 0° C. It is ensured that the pH value does not drop below 8, if necessary by addition of further sodium carbonate. On completion of the coupling, the mixture is neutralized and the dyestuff is isolated by salting out or by evaporating the aqueous solution in vacuo. The resulting dyestuff dyes cellulose by the method described in Example 13 or 14 violet tints which are fast to boiling.

Example 5

An aqueous, hydrochloric acid solution of 23 parts of 4-acetylamidoaniline-2-sulfonic acid is subjected to conventional diazotization with 6.9 parts of sodium nitrite. The diazo compound is coupled with 28.1 parts of 7-acetylamino-1-naphthol-3-sulfonic acid at a pH of 4 to 6. On completion of the coupling the dyestuff is salted out with sodium chloride and filtered off. To hydrolyze the two acetyl groups the product is heated for 1 hour in 500 parts of 4 N-hydrochloric acid at 80° C. The solution is allowed to cool, neutralized, and again treated with sodium chloride. The resulting dyestuff contains two diazotizable amino groups. A neutral aqueous solution of 21.9 parts of the dyestuff is prepared, treated at 45° C. with 46 parts of epichlorohydrin and then stirred until the epichlorohydrin has disappeared, which takes about 5 hours. The dyestuff is isolated and dried at 50° C. By the method described in Example 13 or 14 it produces blue-violet dyeings which are fast to boiling.

Example 6

The disazo dyestuff of the formula

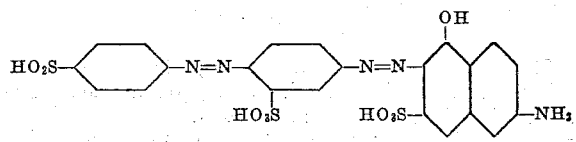

is obtained by coupling diazotized sulphanilic acid with metanilic acid, diazotizing the aminoazo dyestuff once again and coupling it in an alkaline medium with 6-amino-1-naphthol-3-sulfonic acid.

12 parts of this disazo dyestuff are dissolved in 150 parts of water and the solution is neutralized, heated to 50° C. and mixed with 15 parts of epichlorohydrin. The mixture is stirred for 5 hours at 50° C., and the reacted dyestuff is salted out with 26 parts of sodium chloride. When applied to cellulose fibers as described in Example 14, it produces a red tint which is fast to wetting.

Example 7

37 parts of diaminostilbene-disulfonic acid are tetrazotized in the usual manner and coupled at 0° C. with an emulsion of 60 parts of N-N-di-(β-hydroxy-γ-chloropropyl)-aniline in 200 parts of N-hydrochloric acid solution and 200 parts of water. The coupling is completed by neutralization with sodium acetate until the mixture reacts neutral to Congo paper. The resulting dyestuff corresponds to the probable formula.

Instead of the coupling component described above, 2 mols each of the following coupling components may be used:

N:N-diglycidylaniline,
N-methyl-N-glycidylaniline, or
N-methyl-N-(β-hydroxy-γ-chloropropyl)-aniline The coupling components are made by a known method from aniline and methylaniline by reaction with 2 mols or 1 mol respectively of epichlorohydrin. The initially formed β-hydroxy-γ-chloropropylamines can be converted into the corresponding glycidylamines by elimination of hydrogen chloride.

The resulting dyestuffs dye cotton by the method described in Example 13 red tints which are fast to wetting.

Example 8

90 parts of copper phthalocyanine-3:4':4":4'''-tetrasulfonic acid are added to 455 parts of chlorosulfonic acid while being cooled with water. The solution is heated to 80° C. and mixed with 180 parts of thionyl chloride. The reaction is completed by heating for 3 hours at 75° C. The mixture is allowed to cool, poured over ice and washed with ice water until neutral.

The moist suction-filter cake of copper phthalocyanine-3:3':4":4'''-tetrasulfonyl chloride is suspended in 300 parts of water and 100 parts of ice and rendered neutral wtih alkali. A solution of 14 parts of para-formylamidoaniline in 100 parts of N-hydrochloric acid solution is added to the above suspension at 0° C., and the whole is stirred for 3 hours. When the suspension begins to give an acid reaction, it is neutralized with dilute alkali hydroxide solution or alkali carbonate solution. The whole is stirred on at 20° C. while continually neutralizing the liberated acid; after about 20 hours a dyestuff is obtained which is completely dissolved at a pH of 7.5. It is separated by acidification and filtered off, then again dissolved in 800 parts of water and 48 parts of sodium hydroxide and heated for 2 hours at 80° C. to hydrolyse the formyl group. The reaction mixture is allowed to cool, acidified, and the precipitated dyestuff, which probably has the constitution of copper phthalocyanine-3:4':4":4'''- mono - (para - aminosulphanilide) - trisulfonic acid, is isolated and dried. Titrimetric determination reveals the presence of one free diazotizable aromatic amino group per molecule of dyestuff.

A neutral solution is prepared of 20 parts of the dyestuff prepared in this manner in the form of its sodium salt, and the solution is treated at 20° C. with 20 parts of epichlorohydrin. When the epichlorohydrin has disappeared, the dyestuff is salted out with sodium chloride and filtered off; by the methods described in Examples 13, 14 and 15 it produces on both native and regenerated cellulose turquoise-blue dyeings which are very fast to wetting.

Example 9

57.5 parts of copper phthalocynanine are dissolved with cooling in 537 parts of chlorosulfonic acid and heated for 4 hours at 130° C. When the mixture has cooled, it is poured over a mixture of 1000 parts of ice and 290 parts of sodium chloride. By addition of further ice the temperature is kept low. The precipitated sulfochloride is filtered off and washed on the filter with ice-cold sodium chloride solution. The moist product is immediately stirred with 300 parts of water and 300 parts of ice to form a suspension which is then adjusted with dilute sodium hydroxide solution to pH=7.5.

27.2 parts of 4-formylamido-aniline are dissolved in 200 parts of N-hydrochloric acid and combined with the

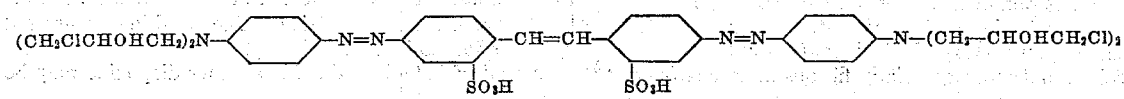

dyestuff suspension. The mixture is stirred first at 0–10° C. and then at room temperature, the liberated acid being bound by strewing in about 32 parts of sodium carbonate. After 20 hours the dyestuff has dissolved at a pH of 7.5. It is precipitated by acidification and filtered off.

The dyestuff acid is again pasted with 1000 parts of water and heated with 60 parts of potassium hydroxide for 2 hours at 80° C. After cooling, the alkaline solution is neutralized and sodium chloride is added, whereby the dyestuff is precipitated; it can then be isolated and dried. As revealed by analysis, 1 mol of the dyestuff contains 1.4 to 1.6 free, diazotizable amino groups.

20 parts of this dyestuff are dissolved in 20 times the amount of water, and the solution is adjusted with acetic acid to pH 5 to 5.5 and then shaken with 20 parts of epichlorohydrin. After 6 hours, the dyestuff is separated with dilute hydrochloric acid solution, filtered off and dried at 45° C. Dyeing as described in Examples 13 and 14 produces brilliant blue tints which are very fast to wetting.

Example 10

0.1 mol of copper phthalocyanine-3:4':4":4"'-tetrasulfonic acid is dissolved in 445 parts of chlorosulfonic acid and heated to 80° C. 178 parts of thionyl chloride are stirred in at 75 to 80° C., and the mixture is heated for 3 hours at 80° C., allowed to cool, poured over ice, and the precipitate is filtered off and washed with water cooled at 0° C. The filter cake is not suctioned completely dry and is kept at 0° C. until it is further processed.

The chloride of copper phthalocyanine-3:4':4":4"'-tetrasulfonic acid prepared in this manner is suspended in 100 parts of water and 100 parts of ice and neutralized to pH=7 to 7.5. A neutral solution in 400 parts of water at 0° C. is prepared of 37.6 parts of meta-phenylenediamino-sulfonic acid, and this solution is combined with the suspension of the sulfochloride. The temperature is kept first at 10° C. and then for 8 hours at 20 to 30° C. During this time the pH of the solution drops continuously and is periodically restored to the neutral point by adding 2 N-sodium hydroxide solution. The amount of 2 N-sodium hydroxide solution consumed varies between 120 and 140 parts. The mixture is then stirred at 25° C. with 9 parts of concentrated aqueous ammonia solution. The final volume is about 800 parts.

The dyestuff is then salted out with 300 parts of saturated sodium chloride solution and 130 parts of solid sodium chloride at 40–50° C. and at pH=5.5, filtered off and again an alkaline solution thereof is prepared. To remove the ammonia, steam is introduced into the solution for 1 hour. After cooling, the solution is adjusted to pH=7 to 7.5 and diluted to a volume of 2000 parts. In the course for 3 hours 160 parts of epichlorohydrin are then introduced at 20° C. with vigorous stirring. After the mixture has been stirred for a total of 20 hours, the epichlorohydrin in the form of a separate layer has completely disappeared. The dyestuff is salted out with 400 parts of sodium chloride, isolated and dried at 50° C. in vacuo.

3 parts of this dyestuff are dissolved in a mixture of 100 parts of water, 8 parts of sodium hydroxide solution of 19° Bé. and 30 parts of urea. This solution is padded on a cotton fabric and fixed for 5 minutes in a current of dry air heated at 140° C. The dyeing is fast to boiling and soap.

Example 11

A neutral solution in 200 parts of water is prepared of 10 parts of the dyestuff formed by reacting 1 mol of copper phthalocyanine-3:3':3":3"'-tetrasulfochloride with 1.5 to 2 mols of monoacetyl-ethylenediamine and alkaline hydrolysis of the remaining sulfochloride groups and of the N-acetyl groups. The mixture is stirred for some length of time at 20° C. with about 10 parts of epichlorohydrin. The dyestuff is then salted out with 10 parts of N-hydrochloric acid solution and filtered off. Dyeing with this dyestuff by the method described in Example 13 produces on cellulose a blue tint which is fast to washing.

Similar results are achieved by using, instead of 1 mol of copper phthalocyanine-3:3':3":3"'-tetrasulfochloride, copper phthalocyanine-3:4':4":4"'- or 4:4':4":4"'-tetrasulfochloride (prepared from the appropriate sulfonic acids with thionyl chloride).

Example 12

10 parts of the dyestuff of the probable composition $$CPC \begin{cases} (SO_3H)_2 \\ (CH_2NH_2)_2 \end{cases} \quad (CPC = \text{copper phthalocyanine residue})$$

(prepared as described in Example 3 of German patent application F 5029/22e, 7/02, which has since matured into German Patent No. 852,588, by treating copper phthalocyanine with oleum and with ω hydroxy-N-methylphthalimide and subsequent hydrolysis of the phthalimide group) are dissolved in 200 parts of water in the form of the disodium salt and at 30° C., in the course of 4 hours, mixed with 30 parts of epichlorohydrin. The whole is stirred on for at least 5 hours longer and the dyestuff is then isolated by acidification. Analysis reveals that of each primary amino group 1 to 2 hydrogen atoms have been replaced by the hydroxy-chloropropyl residue.

When a cotton fabric is padded with an alkaline solution of this dyestuff and then heated at 140° C. to fix it thereon, a blue dyeing of outstanding wet fastness is obtained.

Example 13

2 parts of the dyestuff obtained as described in Example 11 are dissolved in a mixture of 25 parts of urea, 75 parts of water and 2 parts of sodium carbonate. A cotton fabric is padded with this solution and then squeezed until its weight shows an increase of 75 to 100%. The fabric impregnated in this manner is dried, exposed to dry heat of 140° C. for about 5 minutes, rinsed and finally soaped at the boil. The resulting dyeing is extremely fast to wetting.

Example 14

2 parts of the dyestuff obtained as described in Example 4 are dissolved in 100 parts of water. A cotton fabric is padded with this solution and then squeezed until its weight shows an increase of 75%, then dried and impregnated at 20° C. with a solution containing per 1000 parts 10 parts of sodium hydroxide and 300 parts of sodium chloride, squeezed to a weight increase of 75%, steamed for 1 minute at about 100° C., rinsed, soaped at the boil, rinsed and dried. A dyeing results which is fast to boiling.

Example 15

30 parts of the dyestuff as described in Example 9 are dissolved in 339 parts of water, 150 parts of urea are added, the mixture is poured into 450 parts of a sodium alginate thickening, and 30 parts of potassium carbonate and 1 part of a sodium hydroxide solution of 40% by volume strength are added. A cotton fabric is printed with this printing paste in the usual manner and then dried, steamed for 5 minutes at about 100° C., rinsed, soaped, again rinsed and finally dried. A brilliant blue print is obtained in this manner.

What is claimed is:

1. A phthalocynanine dyestuff corresponding to the formula

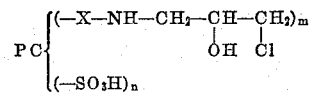

wherein PC stands for the copper phthalocyanine radical, X is a member selected from the group consisting of —CH$_2$—, —SO$_2$—NH-ethylene-, —SO$_2$—NH-phenylene- and —SO$_2$—NH-sulfophenylene-, m is a member ranging from 1 to 2 and $n$ is a member ranging from 2 to 3, the sum of $m$ and $n$ being at most 4.

2. A phthalocyanine dyestuff corresponding to the formula

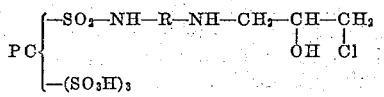

wherein PC stands for the copper phthalocyanine radical and R stands for the ethylene group.

3. A phthalocyanine dyestuff corresponding to the formula

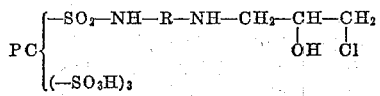

wherein PC stands for the copper phthalocyanine radical and R stands for phenylene.

References Cited in the file of this patent

UNITED STATES PATENTS

| | | |
|---|---|---|
| 2,131,712 | Schoeller et al. | Sept. 27, 1938 |
| 2,300,572 | Hozer et al. | Nov. 3, 1942 |
| 2,309,176 | Dreyfus | Jan. 26, 1943 |
| 2,795,583 | Martin et al. | June 11, 1957 |
| 2,795,584 | Martin et al. | June 11, 1957 |
| 2,861,005 | Siegel | Nov. 18, 1958 |
| 2,863,875 | Bienert et al. | Dec. 9, 1958 |
| 2,873,280 | Bienert et al. | Feb. 10, 1959 |